(12) United States Patent  
Thomas et al.

(10) Patent No.: US 9,705,437 B2  
(45) Date of Patent: Jul. 11, 2017

(54) ANGULAR POSITION ESTIMATION FOR PM MOTORS

(71) Applicant: Texas Instruments Incorporated, Dallas, TX (US)

(72) Inventors: Eric James Thomas, Ann Arbor, MI (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 79 days.

(21) Appl. No.: 14/721,716

(22) Filed: May 26, 2015

(65) Prior Publication Data

US 2016/0087563 A1    Mar. 24, 2016

Related U.S. Application Data

(60) Provisional application No. 62/054,494, filed on Sep. 24, 2014.

(51) Int. Cl.
*H02P 6/182*    (2016.01)

(52) U.S. Cl.
CPC .................................. *H02P 6/182* (2013.01)

(58) Field of Classification Search
CPC .. H02P 6/18; H02P 6/181; H02P 6/182; H02P 6/185; H02P 6/186; H02P 6/187; H02P 6/188
USPC ............ 318/400.32, 400.34, 400.36, 400.33
See application file for complete search history.

(56) References Cited

U.S. PATENT DOCUMENTS

| | | | |
|---|---|---|---|
| 6,208,110 B1 | 3/2001 | O'Meara et al. | |
| 6,734,666 B2 | 5/2004 | Voillat | |
| 7,043,395 B2* | 5/2006 | Vadstrup | H02P 6/17 702/145 |
| 7,977,899 B2* | 7/2011 | Hasegawa | H02P 6/182 318/400.01 |
| 8,179,065 B2 | 5/2012 | Matsuo | |
| 8,384,323 B2* | 2/2013 | Akiyama | H02P 6/18 318/400.02 |
| 8,674,638 B2 | 3/2014 | Balazovic et al. | |
| 2004/0251860 A1* | 12/2004 | Ehsani | H02P 6/06 318/400.01 |

* cited by examiner

*Primary Examiner* — Bentsu Ro
(74) *Attorney, Agent, or Firm* — John R. Pessetto; Charles A. Brill; Frank D. Cimino

(57) ABSTRACT

A method of determining the angular position (θ) of a rotor of an N-phase permanent magnet motor (PMM) includes providing a processor having an associated memory, wherein the memory stores an angular position determination (APD) equation or hardware is included implementing the APD equation. The APD equation determines the angular position from N-phase measurements obtained from the stator windings associated with each of the N-phases. A voltage or a current is forced upon the stator terminals of the stator windings for each of the N-phases, a resulting stator current or stator voltage is sensed to provide the N-phase measurements responsive to the forcing of the voltage or current, and the APD equation is used to determine the angular position from the N-phase measurements.

9 Claims, 5 Drawing Sheets

ANGULAR POSITION ESTIMATION FOR PM MOTORS

CROSS REFERENCE TO RELATED APPLICATIONS

This application claims the benefit of Provisional Application Ser. No. 62/054,494 entitled "Angle Estimation using Motor Phase Measurements" filed Sep. 24, 2014, which is herein incorporated by reference in its entireties.

FIELD

Disclosed embodiments relate to permanent magnet (PM) motors (PMMs), and more specifically to determining the angular position of a PMM for use by a motor controller for position, velocity or current/torque control of the PMM.

BACKGROUND

An electric motor is a machine that converts electrical energy into mechanical energy. Electric motors include DC motors and AC motors. One type of AC motor is an AC induction motor. An AC induction motor is driven by 3-phase alternating current provided by an electric motor controller coupled to a 3-phase inverter. The AC motor includes an outside stationary stator having coils supplied with alternating current to produce a rotating magnetic field, which induces a current in the rotor windings. As the current flows thru the rotor windings, a second magnetic field is generated which interacts with the magnetic field from the stator to produce motion. The rotor is attached to the output shaft that is given a torque by the rotating magnetic field. The interaction of the rotor field and the stator field causes rotation of the rotor which can be used to perform work.

Another type of AC motor is a PMM. PMMs have permanent magnets located on the rotor and copper windings located on the stator. The alternating current in the stator windings produces a rotating magnetic field which interacts with the magnetic field from the rotor magnets to produce motion. The frequency at which the stator current oscillates determines the rotor's angular velocity and the resulting angular position.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include methods for determining the initial angular position ($\theta$) of a rotor at zero speed or near zero speed in an N-phase permanent magnet motor (PMM) using a disclosed angular position determination (APD) equation that determines the angular position from N-phase measurements (i.e. $x_1, \ldots, x_N$) from stator windings associated with each of the N-phases. By controlling the voltage level in each stator winding and measuring the resulting current, the angular position can be determined by the APD equation. Similarly, by controlling the current level in each stator winding and measuring the respective terminal voltages, the angular position can be determined from the APD equation. Disclosed methods can be used with a variety of control methodologies including DC commutation, trapezoidal control, sinusoidal or field oriented control (FOC). Associated motion-control algorithms can use sensor-based or sensorless position sensing techniques, depending on the application.

BRIEF DESCRIPTION OF THE DRAWINGS

Reference will now be made to the accompanying drawings, which are not necessarily drawn to scale, wherein.

DETAILED DESCRIPTION

Figure 1:
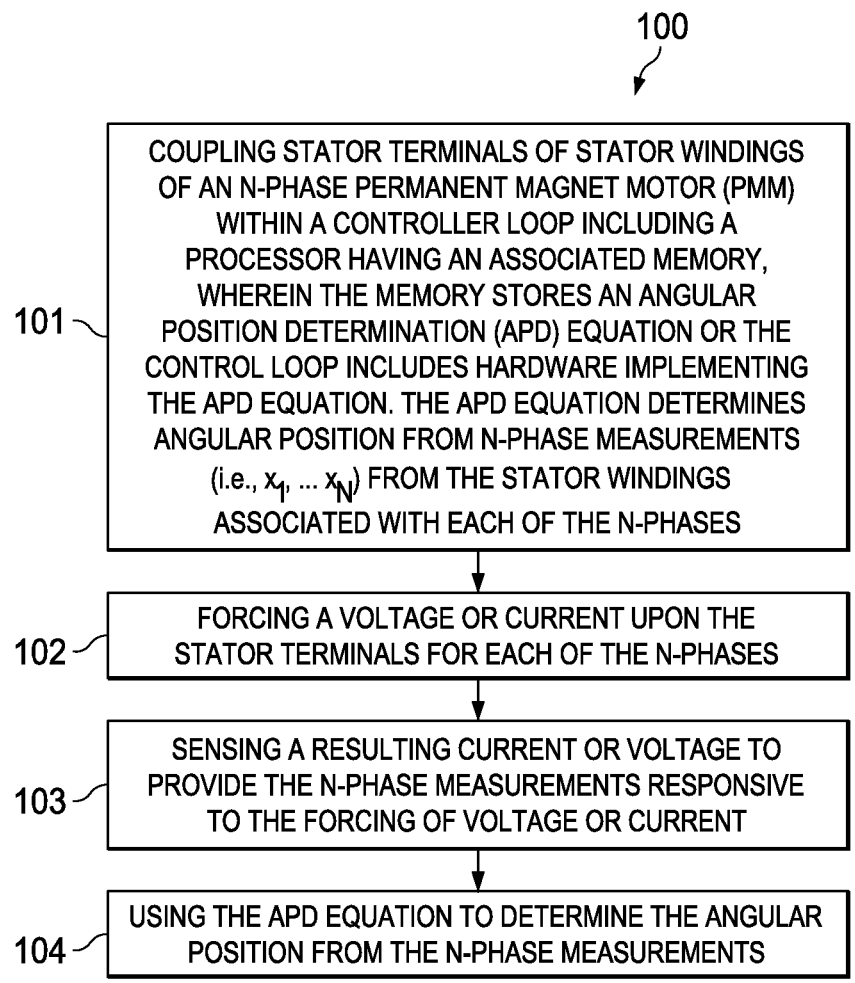
FIG. 1 is a flow chart that shows steps for an example method of angular position estimation for a rotor of a PMM, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Disclosed embodiments include APD equations implemented by algorithms or hardware implementing an APD equation that can be used for determining the angular position of a rotor in a PMM using only N-phase measurements associated with the stator windings. The phase measurements can be obtained from a set of stator current samples or from a set of stator terminal voltage samples. The general solution in APD equation form for determining the angular position of a rotor for a PMM having N-stator phases spaced equally around the circumference of the PMM is first shown. Then the APD equation is applied to a conventional three (N=3) phase PMM which is commonly used in industry. However, disclosed embodiments may be applied to other phase numbers, such as 2-phase, 4-phase, etc. PMMs.

APD Equation Derivation

For an N-phase PMM with equally spaced stator windings around the circumference of the PMM, the phase responses can be written mathematically as:

$$\begin{bmatrix} x_1(t) \\ \vdots \\ x_n(t) \\ \vdots \\ x_N(t) \end{bmatrix} = \begin{bmatrix} A_1 \cdot \cos(\theta(t)) \\ \vdots \\ A_n \cdot \cos\left(\theta(t) + \frac{2\pi \cdot (n-1)}{N}\right) \\ \vdots \\ A_N \cdot \cos\left(\theta(t) + \frac{2\pi \cdot (N-1)}{N}\right) \end{bmatrix} \quad (1)$$

where:

$x_n(t)$ is the current or voltage phase measurement from the $n^{th}$ phase at time instant t;

$A_n$ is the magnitude of the $n^{th}$ phase measurement;

$\theta(t)$ is the $\theta$ as a function of time (or electrical angle) of the rotor (in a $2\pi$ as from $-\pi$ to $+\pi$)

For reference, $\theta(t)$ of the rotor can be written in terms of the angular electrical speed ($\omega$) as:

$$\theta(t) = \omega \cdot t \quad (2)$$

Expanding Equation (1) yields the following form:

$$\begin{bmatrix} x_1 \\ \vdots \\ x_n \\ \vdots \\ x_N \end{bmatrix} = \begin{bmatrix} A_1 \cdot \cos(\theta) \\ \vdots \\ A_n \cdot \left(\cos(\theta)\cos\left(\frac{2\pi \cdot (n-1)}{N}\right) - \sin(\theta)\sin\left(\frac{2\pi \cdot (n-1)}{N}\right)\right) \\ \vdots \\ A_N \cdot \left(\cos(\theta)\cos\left(\frac{2\pi \cdot (N-1)}{N}\right) - \sin(\theta)\sin\left(\frac{2\pi \cdot (N-1)}{N}\right)\right) \end{bmatrix} \quad (3)$$

where the time notation for $\theta$ has been dropped for convenience. Equation 3 can be rewritten in matrix form as:

$$\begin{bmatrix} x_1 \\ \vdots \\ x_n \\ \vdots \\ x_N \end{bmatrix} = \begin{bmatrix} -A_1 \cdot \sin(0) & A_1 \cdot \cos(0) \\ \vdots & \vdots \\ -A_n \cdot \sin\left(\frac{2\pi \cdot (n-1)}{N}\right) & A_n \cdot \cos\left(\frac{2\pi \cdot (n-1)}{N}\right) \\ \vdots & \vdots \\ -A_N \cdot \sin\left(\frac{2\pi \cdot (N-1)}{N}\right) & A_N \cdot \cos\left(\frac{2\pi \cdot (N-1)}{N}\right) \end{bmatrix} \begin{bmatrix} \sin(\theta) \\ \cos(\theta) \end{bmatrix} \quad (4)$$

which can be written in the following general form:

$$X = Z \cdot \Theta$$

where $$X = \begin{bmatrix} x_1 \\ \vdots \\ x_n \\ \vdots \\ x_N \end{bmatrix}$$

$$Z = \begin{bmatrix} -A_1 \cdot \sin(0) & A_1 \cdot \cos(0) \\ \vdots & \vdots \\ -A_n \cdot \sin\left(\frac{2\pi \cdot (n-1)}{N}\right) & A_n \cdot \cos\left(\frac{2\pi \cdot (n-1)}{N}\right) \\ \vdots & \vdots \\ -A_N \cdot \sin\left(\frac{2\pi \cdot (N-1)}{N}\right) & A_N \cdot \cos\left(\frac{2\pi \cdot (N-1)}{N}\right) \end{bmatrix}$$

$$\Theta = \begin{bmatrix} \sin(\theta) \\ \cos(\theta) \end{bmatrix}$$

Since the matrix Z is not square, a least squares approach can be used to solve for the $\Theta$ matrix. Solving for the $\Theta$ matrix yields the following:

$$\Theta = (Z^T \cdot Z)^{-1} Z^T X$$

As a result, the vector containing the sine and cosine terms become:

$$\begin{bmatrix} \sin(\theta) \\ \cos(\theta) \end{bmatrix} = (Z^T \cdot Z)^{-1} Z^T X$$

Knowing the following relationship:

$$\tan(\theta) = \frac{\sin(\theta)}{\cos(\theta)}$$

the tangent (tan) can be written as:

$$\tan(\theta) = \frac{\left(\sum_{n=1}^{N} A_n^2 \sin\left(\frac{2\pi \cdot (n-1)}{N}\right)\cos\left(\frac{2\pi \cdot (n-1)}{N}\right)\right)\left(\sum_{n=1}^{N} A_n x_n \cos\left(\frac{2\pi \cdot (n-1)}{N}\right)\right) - \left(\sum_{n=1}^{N} A_n^2 \cos^2\left(\frac{2\pi \cdot (n-1)}{N}\right)\right)\left(\sum_{n=1}^{N} A_n x_n \sin\left(\frac{2\pi \cdot (n-1)}{N}\right)\right)}{\left(\sum_{n=1}^{N} A_n^2 \sin^2\left(\frac{2\pi \cdot (n-1)}{N}\right)\right)\left(\sum_{n=1}^{N} A_n x_n \cos\left(\frac{2\pi \cdot (n-1)}{N}\right)\right) - \left(\sum_{n=1}^{N} A_n^2 \sin\left(\frac{2\pi \cdot (n-1)}{N}\right)\cos\left(\frac{2\pi \cdot (n-1)}{N}\right)\right)\left(\sum_{n=1}^{N} A_n x_n \sin\left(\frac{2\pi \cdot (n-1)}{N}\right)\right)}$$

Solving for the angle yields:

$$\theta = \tan^{-1}\left\{ \frac{\left(\sum_{n=1}^{N} A_n^2 \sin\left(\frac{2\pi \cdot (n-1)}{N}\right)\cos\left(\frac{2\pi \cdot (n-1)}{N}\right)\right)\left(\sum_{n=1}^{N} A_n x_n \cos\left(\frac{2\pi \cdot (n-1)}{N}\right)\right) - \left(\sum_{n=1}^{N} A_n^2 \cos^2\left(\frac{2\pi \cdot (n-1)}{N}\right)\right)\left(\sum_{n=1}^{N} A_n x_n \sin\left(\frac{2\pi \cdot (n-1)}{N}\right)\right)}{\left(\sum_{n=1}^{N} A_n^2 \sin^2\left(\frac{2\pi \cdot (n-1)}{N}\right)\right)\left(\sum_{n=1}^{N} A_n x_n \cos\left(\frac{2\pi \cdot (n-1)}{N}\right)\right) - \left(\sum_{n=1}^{N} A_n^2 \sin\left(\frac{2\pi \cdot (n-1)}{N}\right)\cos\left(\frac{2\pi \cdot (n-1)}{N}\right)\right)\left(\sum_{n=1}^{N} A_n x_n \sin\left(\frac{2\pi \cdot (n-1)}{N}\right)\right)} \right\}$$

Assuming that all of the magnitudes of the respective current or voltage phase measurements are the same value (i.e., $A_1 = A_n = A_N$), the above $\theta$ equation simplifies to:

$$\theta = \tan^{-1}\left(-\frac{\sum_{n=1}^{N} x_n \cdot \sin\left(\frac{2\pi \cdot (n-1)}{N}\right)}{\sum_{n=1}^{N} x_n \cdot \cos\left(\frac{2\pi \cdot (n-1)}{N}\right)}\right) \quad (10)$$

Thus, given N-phase measurements (i.e., $x_1, \ldots, x_N$) (i.e., levels of current or voltage for phases 1, 2, ..., N) sensed from stator current or stator voltage waveforms which will be near-constant if the rotor is not rotating, equation 9 or 10 can be used by a processor implementing a disclosed APD algorithm or by equation implementing hardware to determine the initial angular position of the rotor in the PMM. Alternatively, the angular position of the rotor in the PMM can be determined at any time while the PMM is operating (spinning) at a low speed by sampling to obtain the N-phase measurements.

As noted above, the APD equation may be implemented by hardware or by software (algorithm). Regarding hardware-based implementations, a disclosed APD equation can be converted to a logic gate pattern, such as using VHDL which can then be realized such as using field-programmable gate array (FPGA) or application-specific integrated circuit (ASIC) to implement the logic gate pattern. VHDL is an acronym which stands for VHSIC (Very High Speed Integrated Circuits) Hardware Description Language. For example, a software-based implementation can be realized using a math library on a conventional MCU chip.

FIG. 1 is a flow chart that shows steps for an example method 100 of determining the angular position of a rotor in an N-phase PMM. Step 101 comprises providing a processor having an associated memory, wherein the memory stores an angular position determination (APD) equation or hardware is included for implementing the APD equation, where the APD equation determines the angular position from N-phase measurements (i.e., $x_1, \ldots, x_N$), from the stator windings associated with each of the N-phases. Step 102 comprises forcing a voltage or current upon the stator terminals of stator windings for each of the N-phases. Step 103 comprises sensing a resulting current or voltage to provide the N-phase measurements responsive to the forcing of voltage or current. Step 104 comprises using the APD equation to determine the angular position from the N-phase measurements.

Figure 2A:
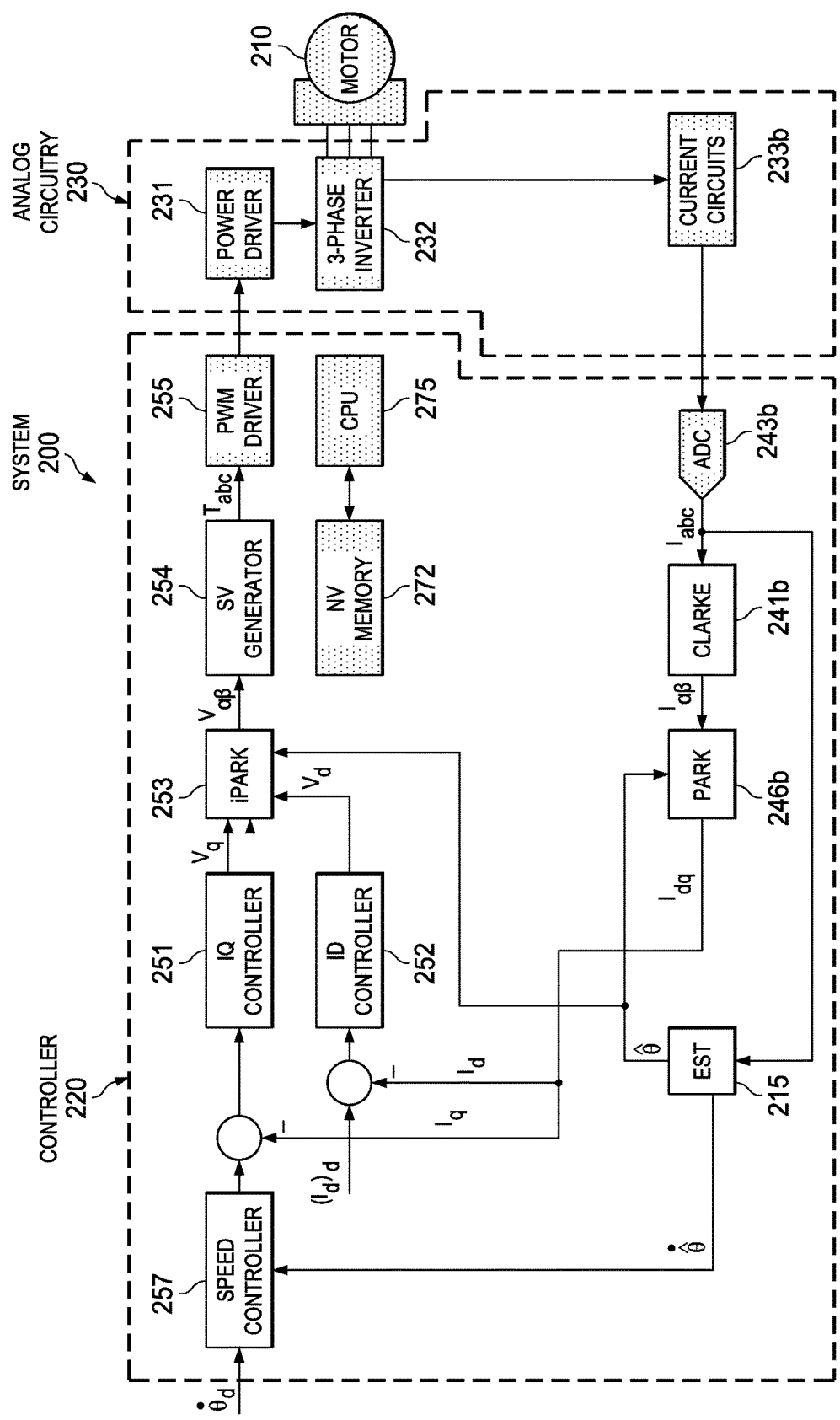
FIG. 2A depicts a block diagram depiction of a control system with a FOC controller implementing current sensed control, according to an example embodiment.

FIG. 2A shows an example block diagram depiction of a FOC controlled motor system 200 having an estimation and velocity estimation (EST) block 215 which contains a disclosed angle position estimation block, integrated within a FOC controller 220 implementing current sensed control which controls a PMM 210 shown as a three-phase motor, according to an example embodiment. FOC is also called vector control which is known to be a variable frequency drive (VFD) control method that applies generally to all electric motors where there is access to the d axis component of the current (Id) to enable closing a loop on Id and access to the q axis current (Iq) to enable closing a loop on Iq, which FOC does.

FOC controller 220 includes a non-volatile (NV) memory 272, such as read only memory (ROM) or static random access memory (SRAM), and a processor shown as a central processing unit (CPU) 275 that implements in software all the blocks in the unshaded (non-dotted) blocks shown in FIG. 2A. Hardware components of system 200 such as CPU 275 and NV 272 are shown in dotted blocks to distinguish them from components of system 200 implemented in software.

System 200 also includes analog circuitry 230 between the FOC controller 220 and the PMM 210 comprising power driver 231, 3-phase inverter 232, and current measurement circuits 233b shown as "current circuits". The FOC controller 220 includes analog-to-digital converters (ADC's) 243b coupled to receive outputs from the current measurement circuits 233b, and a PWM driver 255 for driving the power driver 231.

The FOC controller 220 can be a sensorless FOC controller or can be a FOC controller having a sensor. FOC controllers having sensors can include encoders and sensors that measure position directly and then estimate the angular speed therefrom. FOC controller 220 can be implemented by a MCU, such as the MCU chip 300 shown in FIG. 3 described below. Circuitry other than a MCU can also be used to realize FOC controller 220 implementing an algorithm for a disclosed EST block 215, such as coprocessors or accelerators built using application-specific integrated circuit (ASIC) logic gates or FPGAs.

The ADC's 243b output phase currents are coupled to the input of the EST block 215. The EST block 215 generates for each phase current an angle estimate $\hat{\theta}$ and angular velocity estimate $\dot{\hat{\theta}}$. The $\hat{\theta}$ with a dot (.) above denotes an estimated angular velocity which is provided by the EST block 215 to the speed controller 257 shown.

The ADC's 243b output phase currents shown as Iabc that is coupled to an input of the Clarke block 241b which performs the known Clarke transformation which generates Iαβ that is coupled to an input of the Park block 246b. Park block 246b performs the known Park transformation to provide outputs Idq being measured phase current values from the stator of the PMM 210 which are added to the input of the ID current controller 252 and to the input of the IQ current controller 251 as shown in FIG. 2A. $\hat{\theta}$ is shown coupled to an inverse Park (iPARK) block 253 which receives the Vq output from IQ controller 251 and the Vd output from the ID current controller 252 as other inputs.

The iPARK block 253 outputs Vαβ which is coupled to SV generator block 254, where the output of SV generator block 254 is coupled to PWM driver 255. The SV generator computes the PWM time durations for each phase of the motor to produce the desired Vαβ voltage values.

Figure 2B:
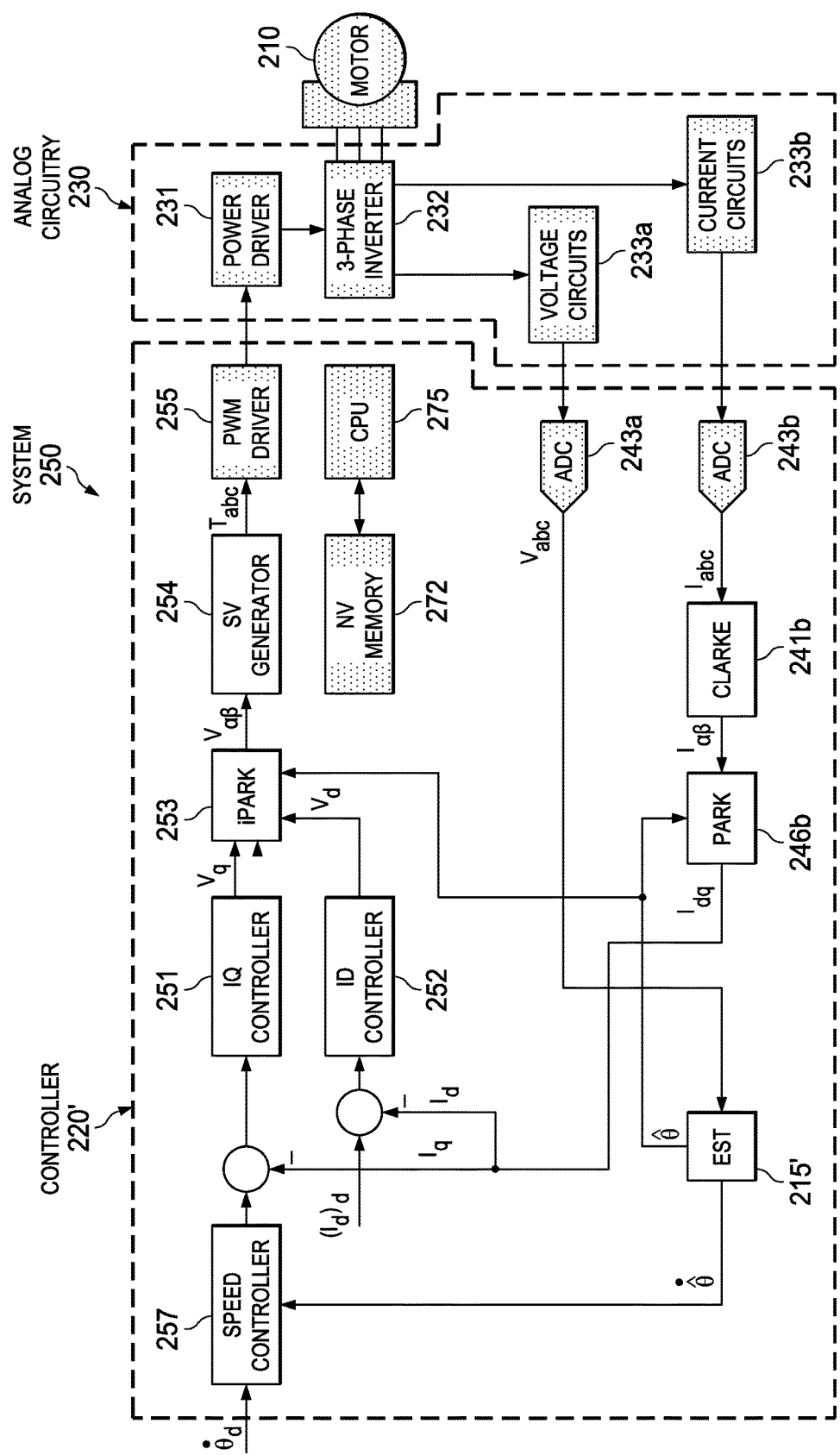
FIG. 2B depicts a block diagram depiction of a control system with a FOC controller implementing voltage sensed control, according to an example embodiment.

FIG. 2B shows an example block diagram depiction of a FOC controlled motor system 250 having a disclosed EST block 215' integrated within a FOC controller 220' implementing voltage sensed control that controls a PMM 210 shown as a three-phase motor, according to an example embodiment. FOC controlled motor system 250 resembles FOC controlled motor system 200 shown in FIG. 2A except EST block 215' receives a Vabc input instead of an Iabc input (as for EST block 215 in FIG. 2A) that is generated by the voltage measurement circuits (shown as "voltage circuits") 233a coupled to an output of the 3-phase inverter 232. The output from voltage circuits 233a is coupled to ADC 243a which generates Vabc that is coupled to EST block 215'. In this voltage mode control embodiment, the 3-phase inverter 232 forces current on each of the phases.

Figure 3:
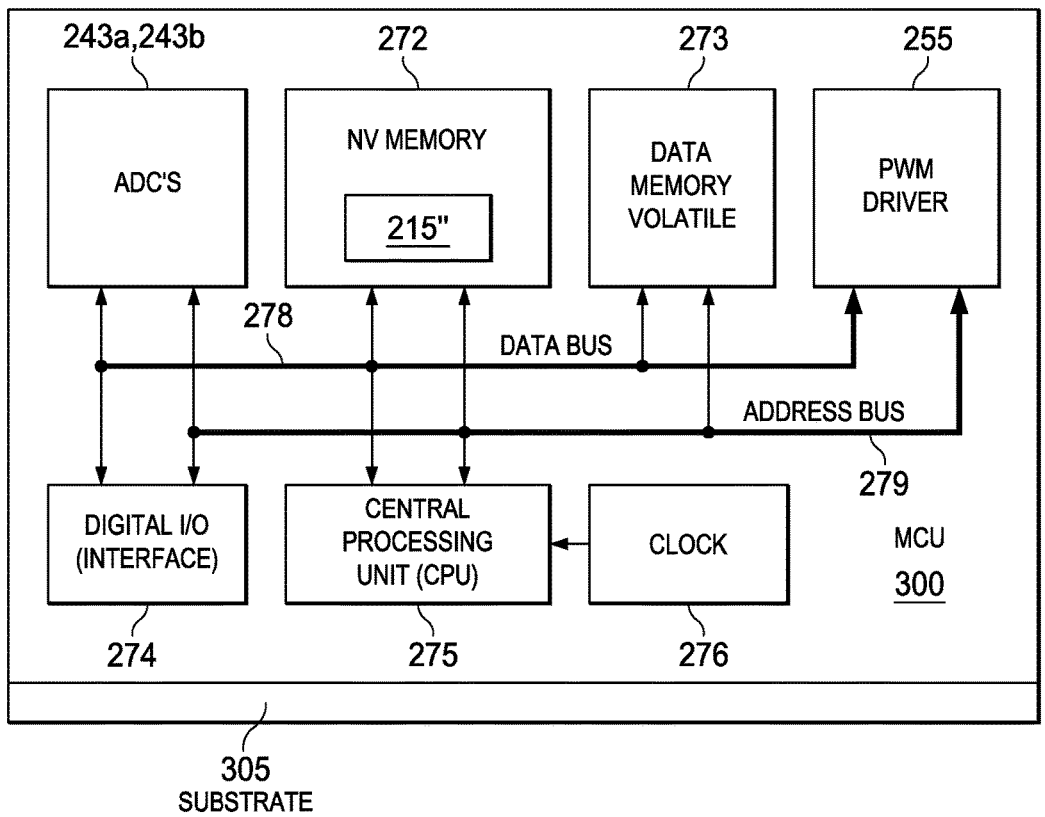
FIG. 3 is a block diagram depiction of an example microcontroller unit (MCU) chip implementing the FOC controller shown in FIG. 2A or 2B, according to an example embodiment.

FIG. 3 is a block diagram depiction of an example MCU chip 300 formed in and on a substrate 305 implementing the FOC controller 220 shown in FIG. 2A or FOC controller 220' shown in FIG. 2B, according to an example embodiment. Although not shown, the MCU chip 300 generally includes other integrated circuit modules, for example, a Universal Serial Bus (USB) controller and a transceiver. MCU chip 300 is shown including NV memory 272, volatile data memory 273, digital I/O (interface) 274, CPU 275, and clock (or timer) 276. A core for implementing EST block 215 or 215' is shown as block 215'' stored in NV memory 272. MCU chip 300 is also shown including a digital data bus 278 and an address bus 279.

MCU chip 300 is shown as a monolithic integrated circuit (IC). The substrate 305 may comprise silicon, such as bulk silicon or silicon epi on a bulk silicon substrate. The substrate 305 may also generally comprise other materials, such as elementary semiconductors besides silicon including germanium. Substrate 305 may also generally comprise a compound semiconductor.

EXAMPLES

Disclosed embodiments are further illustrated by the following specific examples, which should not be construed as limiting the scope or content of this Disclosure in any way.

Regarding a three phase PMM (N=3, phases A, B and C), the equation for angular position (θ) of its rotor has three terms, which can be expressed mathematically as:

$$\theta = \tan^{-1}\left(-\frac{x_1 \cdot \sin(0) + x_2 \cdot \sin\left(\frac{2\pi}{3}\right) + x_3 \cdot \sin\left(\frac{4\pi}{3}\right)}{x_1 \cdot \cos(0) + x_2 \cdot \cos\left(\frac{2\pi}{3}\right) + x_3 \cdot \cos\left(\frac{4\pi}{3}\right)}\right)$$

Using $$\sin(0) = 0, \sin\left(\frac{2\pi}{3}\right) = \frac{\sqrt{3}}{2}, \sin\left(\frac{4\pi}{3}\right) = -\frac{\sqrt{3}}{2}, \cos(0) = 1,$$

$$\cos\left(\frac{2\pi}{3}\right) = -\frac{1}{2} \text{ and } \cos\left(\frac{4\pi}{3}\right) = -\frac{1}{2},$$

the above θ equation can be written as:

$$\theta = \tan^{-1}\left(\frac{\frac{\sqrt{3}}{2} \cdot (x_3(t) - x_2(t))}{x_1(t) - \frac{1}{2} \cdot (x_2(t) + x_3(t))}\right)$$

where $x_1$, $x_2$ and $x_3$ are the respective stator phase measurements, which are currents for current mode control and voltages for voltage mode control that can be used by a disclosed FOC controller implementing an APD equation. To demonstrate the effectiveness of a disclosed APD equation using current sensed control, a FOC controller analogous to FOC controller 220 shown in FIG. 2A was used to implement a control loop with the PMM.

Figure 4:
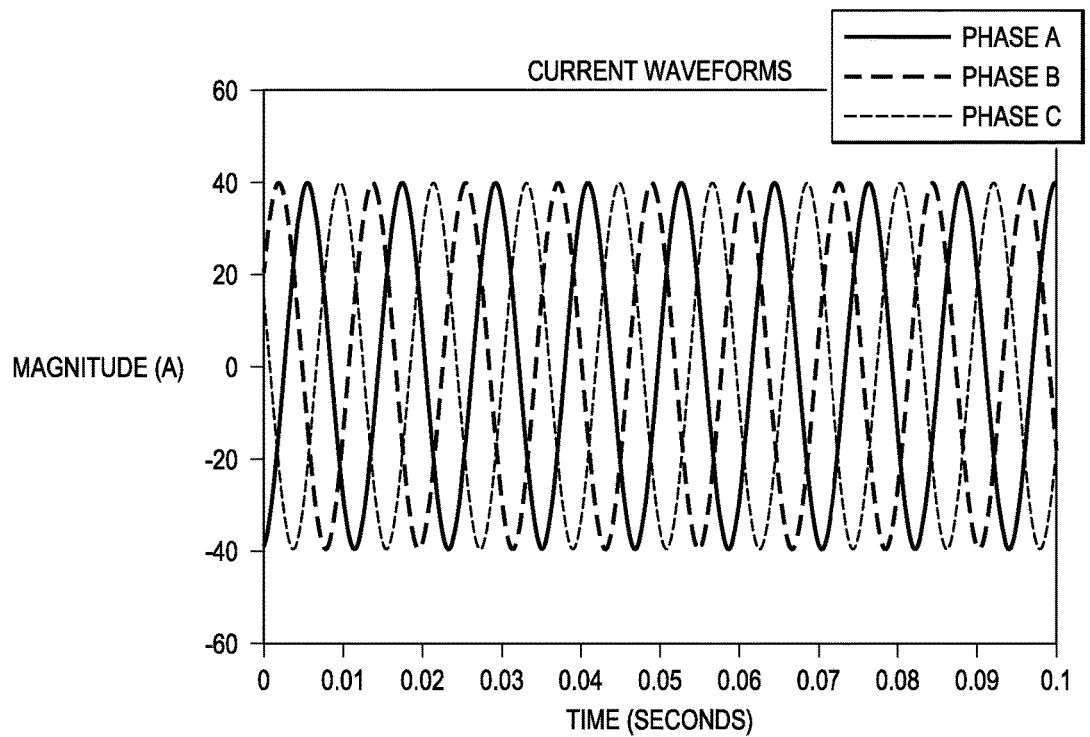
FIG. 4 shows a typical plot of stator current waveforms for phases A, B and C showing the current phase responses sensed from the PMM which serve as the three inputs to a disclosed APD algorithm or equation.

FIG. 4 shows a typical plot of current waveforms for phases A, B and C showing the current phase responses sensed from the stator windings of the PMM which serve as the three inputs to a disclosed APD algorithm. The applied voltage to the terminals of the stator windings was at 85 Hz and set to a magnitude to provide 40A magnitude phase currents. The phase current responses for phases A, B and C are seen to be 120 degrees out of phase from one another.

Figure 5:
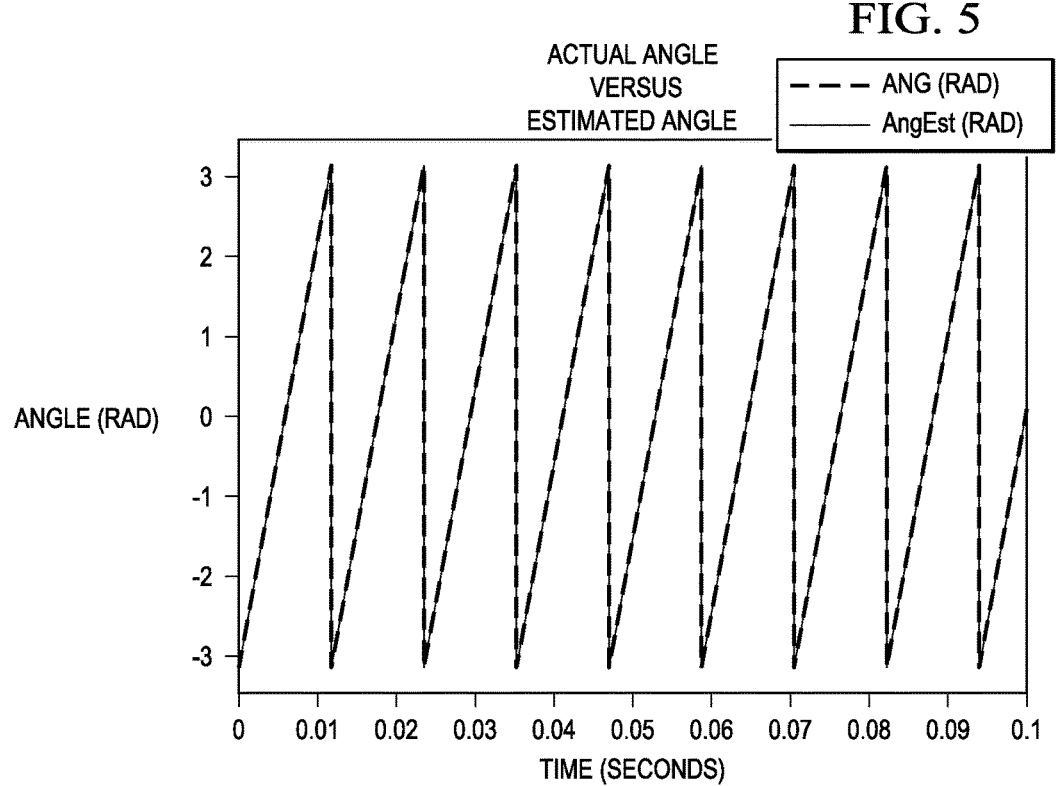
FIG. 5 shows a comparison between the actual angular position values of a rotor of a PMM and the estimated angular position ($\hat{\theta}$) values obtained from a disclosed APD algorithm when the current magnitudes of each phase response are balanced exactly (balanced phases).

FIG. 5 shows a comparison between the actual angular position (θ) values of a rotor and the estimated angular position ($\hat{\theta}$) values obtained from a disclosed APD equation when the stator current magnitudes of each phase response are balanced exactly (balanced phases). In this balanced phase scenario, it can be seen that the estimated angular position ($\hat{\theta}$) values obtained from the APD equation match the actual angular position (θ) values exactly.

Figure 6:
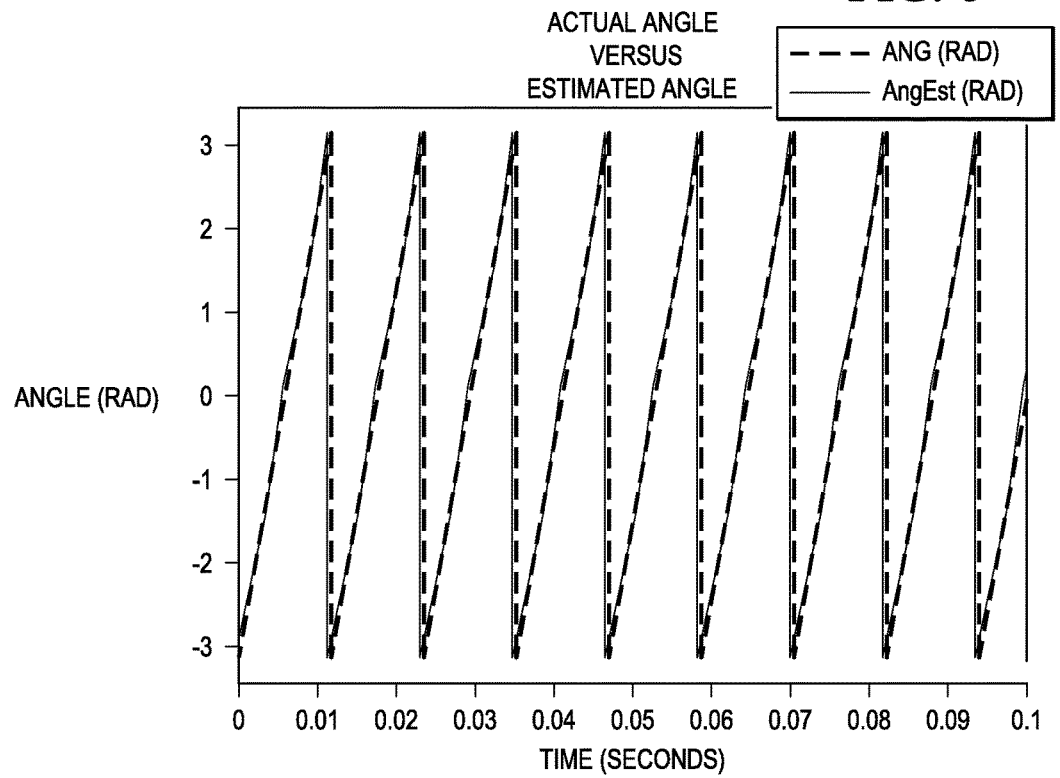
FIG. 6 shows the performance of a disclosed APD algorithm for angular position estimation when there is a mismatch in the phase current magnitudes (A1≠A2≠A3; i.e., unbalanced phases).

FIG. 6 shows the performance of a disclosed APD equation for θ estimation when there is a mismatch in the phase current magnitudes (A1≠A2≠A3; unbalanced phases). In this example, the current magnitude of phase 2 was 1.3 times the magnitude of phase 1, and the magnitude of phase 3 was 0.6 times the magnitude of phase 1. There is a higher order harmonic that gets introduced into the angle response. The maximum absolute angle error in this example is 6.08 degrees, which is sufficient accuracy for most PMM applications. Also, for many PMM applications, the degree of current unbalance is not this extreme. In situations where the current unbalance is 5%, the maximum angle error is 0.014 degrees.

In a real PMM system application, the phase current or voltage responses are generally not as "clean" as those shown and described above. For example, the PWM signaling by the FOC controller introduces harmonics into the phase signals. As a result, the respective phase signals receive signal processing before applying the APD equation (shown as EST block 215) where each phase signal has a signal path that is low pass filtered in the analog domain after being received from the 3-phase inverter 232 and then sampled (by ADC's), such as shown by including filters in the voltage circuits 233a or current circuits 233b and the ADC's 243a and 243b shown in FIGS. 2A and 2B.

Benefits of disclosed APD equations include reduced computation complexity since the number of computations for determining the angular position of the rotor in a PMM is significantly reduced as compared to known angular position estimation methods. The APD equation also does not depend on a particular PMM model. Moreover, as noted above, disclosed APD equations can work with either sensed current waveforms (current sensed mode) or sensed voltage waveforms (voltage sensed mode).

Disclosed method of determining the angular position of a rotor in an N-phase PMM can be implemented for a variety of motor control methodologies, for example FOC using the Texas Instruments' INSTASPIN-FOC sensorless motor control technology, such as for PICCOLO and POTENZA MCU chip-based motor controllers. In the case of INSTASPIN-FOC technology and related technology, for example, code for a disclosed APD equation can be embedded in the ROM of the MCU chip (see NV memory 272 in FIG. 2B), such as to accelerate motor control development while improving efficiency. Motor control applications include for washing machines, compressors, pumps, fans, electric bicycles, tools, treadmills, compact drives, sewing and textile machines, lifts and hobby motors.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of determining an angular position of a rotor in an N-phase permanent magnet motor (PMM), comprising:
providing a processor having an associated memory, wherein said memory stores an angular position determination (APD) equation or hardware is included implementing said APD equation, said APD equation determining said angular position from N-phase measurements obtained from stator windings associated with each of said N-phases;
forcing a voltage or a current upon stator terminals of said stator windings for each of said N-phases;
sensing a resulting stator current or stator voltage to provide said N-phase measurements responsive to said forcing said voltage or current, and
using said APD equation, determining said angular position from said N-phase measurements;
wherein said forcing comprises forcing said voltage and said sensing comprises sensing said resulting stator current;
wherein said sensing said resulting stator current comprises sensorless sensing; wherein said APD equation is given by:

$$\theta = \tan^{-1}\left\{\frac{\left(\sum_{n=1}^{N} A_n^2 \sin\left(\frac{2\pi \cdot (n-1)}{N}\right)\cos\left(\frac{2\pi \cdot (n-1)}{N}\right)\right)}{\left(\sum_{n=1}^{N} A_n x_n \cos\left(\frac{2\pi \cdot (n-1)}{N}\right)\right) - \left(\sum_{n=1}^{N} A_n^2 \cos^2\left(\frac{2\pi \cdot (n-1)}{N}\right)\right)\left(\sum_{n=1}^{N} A_n x_n \sin\left(\frac{2\pi \cdot (n-1)}{N}\right)\right)}\right\}$$

$$\left(\sum_{n=1}^{N} A_n^2 \sin^2\left(\frac{2\pi \cdot (n-1)}{N}\right)\right)\left(\sum_{n=1}^{N} A_n x_n \cos\left(\frac{2\pi \cdot (n-1)}{N}\right)\right) - \left(\sum_{n=1}^{N} A_n^2 \sin\left(\frac{2\pi \cdot (n-1)}{N}\right)\cos\left(\frac{2\pi \cdot (n-1)}{N}\right)\right)\left(\sum_{n=1}^{N} A_n x_n \sin\left(\frac{2\pi \cdot (n-1)}{N}\right)\right)$$

wherein said $\theta$ is said angular position, said $A_n$ is a magnitude of said $n^{th}$ phase and said $x_n$ is said $n^{th}$ phase measurement.

2. The method of claim 1, wherein said $A_n$ are all equal so that said APD equation simplifies to become:

$$\theta = \tan^{-1}\left(-\frac{\sum_{n=1}^{N} x_n \cdot \sin\left(\frac{2\pi \cdot (n-1)}{N}\right)}{\sum_{n=1}^{N} x_n \cdot \cos\left(\frac{2\pi \cdot (n-1)}{N}\right)}\right).$$

3. A microcontroller unit (MCU) chip, comprising:
a substrate having the following formed in or thereon configured to realize a motor controller for controlling an N-phase permanent magnet motor (PMM) including a rotor, including:
at least one analog-to-digital converter (ADC) for receiving N-phase measurements from stator windings of said N-phase PMM associated with each of said N-phases;
a first non-volatile program memory;
an angular position determination (APD) equation for determining angular position of said rotor from said N-phase measurements stored as an algorithm on said first non-volatile program memory or implemented as hardware;
a central processing unit (CPU) coupled through a digital I/O (interface) to receive said N-phase measurements after processing by said ADC's;
a clock, and
a digital data bus and an address bus for coupling together said ADC, said first non-volatile program memory, said digital I/O (interface), said CPU, and said clock,
wherein said MCU chip is for:
forcing a voltage or current upon stator terminals for each of said N-phases,
sensing a resulting stator current or stator voltage to provide said N-phase measurements responsive to said forcing said voltage or current, and
determining said angular position from said N-phase measurements using said APD equation.

4. The MCU chip of claim 3, wherein said motor controller comprises a field-oriented controller (FOC).

5. The MCU chip of claim 3, wherein said forcing comprises forcing said current and said sensing comprises sensing said resulting stator voltage.

6. The MCU chip of claim 3, wherein said forcing comprises forcing said voltage and said sensing comprises sensing said resulting stator current.

7. The MCU chip of claim 3, wherein said sensing said resulting stator current comprises sensorless sensing.

8. The MCU chip of claim 3, wherein said APD equation is stored as said algorithm on said first non-volatile program memory.

9. The MCU chip of claim 3, wherein said substrate comprises silicon.

* * * * *